US006766832B2

(12) United States Patent
DiMarco (10) Patent No.: US 6,766,832 B2
(45) Date of Patent: Jul. 27, 2004

(54) TRANSITIONAL TELESCOPING PLENUM APPARATUS

(76) Inventor: Benjamin M. DiMarco, 137 Coventry Ct., Chagrin Falls, OH (US) 44023

( * ) Notice: Subject to any disclaimer, the term of this patent is extended or adjusted under 35 U.S.C. 154(b) by 0 days.

(21) Appl. No.: 10/324,479

(22) Filed: Dec. 19, 2002

(65) Prior Publication Data

US 2003/0116213 A1 Jun. 26, 2003

Related U.S. Application Data

(60) Provisional application No. 60/342,701, filed on Dec. 20, 2001.

(51) Int. Cl.[7] .................................................. F16L 9/22
(52) U.S. Cl. ............................... 138/114; 138/DIG. 4; 138/155; 138/177; 285/424; 285/302
(58) Field of Search ............................... 138/155, 177, 138/DIG. 4, 114; 285/424, 302

(56) References Cited

U.S. PATENT DOCUMENTS

| 724,210 | A | | 3/1903 | Scherer ................. 285/123.16 |
|---|---|---|---|---|
| 2,201,312 | A | * | 5/1940 | Hauser ......................... 237/50 |
| 2,227,587 | A | * | 1/1941 | Jones et al. ............... 285/125.1 |
| 2,477,315 | A | | 7/1949 | Smith .......................... 285/205 |
| 4,123,094 | A | | 10/1978 | Smitka ........................ 285/405 |
| 4,265,473 | A | | 5/1981 | Russo .......................... 285/229 |
| 4,564,227 | A | | 1/1986 | Murck ......................... 285/364 |
| 4,579,375 | A | | 4/1986 | Fischer et al. .............. 285/363 |
| 4,620,339 | A | * | 11/1986 | Shepheard ................... 14/71.5 |
| 5,165,730 | A | | 11/1992 | McElroy ...................... 285/39 |
| 5,660,212 | A | * | 8/1997 | Elder .......................... 138/157 |
| 5,661,263 | A | * | 8/1997 | Salvaggio .................... 174/48 |
| 5,865,478 | A | | 2/1999 | Lin ............................. 285/405 |

\* cited by examiner

*Primary Examiner*—Patrick Brinson
(74) *Attorney, Agent, or Firm*—Renner, Kenner, Greive, Bobak, Taylor & Weber (57) ABSTRACT

The present invention provides a transitional telescoping plenum apparatus that is intended to facilitate the interconnection of HVAC equipment to duct systems. The unit expands in length, width and height directions, and is composed of modular tier sections. Each modular tier includes at least four corner sections, with each corner section being interleaved with two adjacent corner sections to complete a single modular tier. Each modular tier includes a tier-connecting flange that communicates with a tier-connecting flange on another modular tier, such that the modular tiers can be interconnected to form a finished transitional telescoping plenum apparatus. Clips are also taught for connecting modular tiers to each other.

6 Claims, 7 Drawing Sheets

TRANSITIONAL TELESCOPING PLENUM APPARATUS

RELATED APPLICATIONS

The present application is based upon U.S. Provisional Patent Application No. 60/342,701, filed Dec. 20, 2001, incorporated herein by reference.

BACKGROUND OF THE INVENTION

The present invention generally relates to a plenum apparatus for interconnecting heating, ventilating, and air conditioning (HVAC) equipment or connecting HVAC equipment to ductwork. More particularly, the present invention relates to a transitional telescoping plenum apparatus that is able to expand in length, width and height dimensions to fit virtually any particular application that may be encountered in a given installation.

Over the past decade or so, many products have been developed to help contractors in time-savings efforts, and to provide them with quick-connect applications for installations of HVAC equipment. Products such as corrugated stainless steel tubing, electrical "whips," pre-charged refrigeration lines, and many other devices have been developed to help reduce instillation time on the job.

Sheet metal products have been the only types of products that have not followed in this push for labor savings. Although there are currently many types of pre-fabricated return airdrops and fixed size plenums, a general problem exists for wholesales in that they have to carry numerous sizes to accommodate the various equipment with which they are to be installed. This often translates into inventory problems for wholesalers and availability problems for contractors. Additionally, field technicians must cut and bend and fold, by hand, an incredible amount of variations to fit these pre-fabricated plenums to a given application.

The transitional telescoping plenum apparatus of the present invention addresses these problems by providing a "one size fits all" plenum apparatus for HVAC equipment installations.

SUMMARY OF THE INVENTION

In general, the present invention provides a transitional telescoping plenum apparatus having a first tier including at least first, second, third, and fourth corner sections interleaved to provide the first tier with an at least four-sided configuration that is adjustable in width and length dimensions, the first tier providing a mounting flange at a first edge thereof and a tier-connecting flange at a second edge thereof; and a second tier including at least first, second, third, and fourth corner sections interleaved to provide the second tier with an at least four-sided configuration complimentary to the at least four-sided configuration of the first tier and adjustable in width and length dimensions, the second tier providing a tier-connecting flange at a first edge thereof communicating with the tier-connecting flange of the first tier to connect the first and second tiers, wherein the height of the transitional telescoping plenum apparatus is adjustable according to the distance maintained between the tier-connecting flanges of the first tier and the second tier.

As will be show below, in other embodiments, three or more tiers are employed, with each additional tier providing a structure that is complimentary to the tier or tiers to which it is to be attached, so as to create a complete transitional telescoping plenum apparatus comprised of multiple modular tiers.

PREFERRED EMBODIMENT FOR CARRYING OUT THE INVENTION

Figure 1:
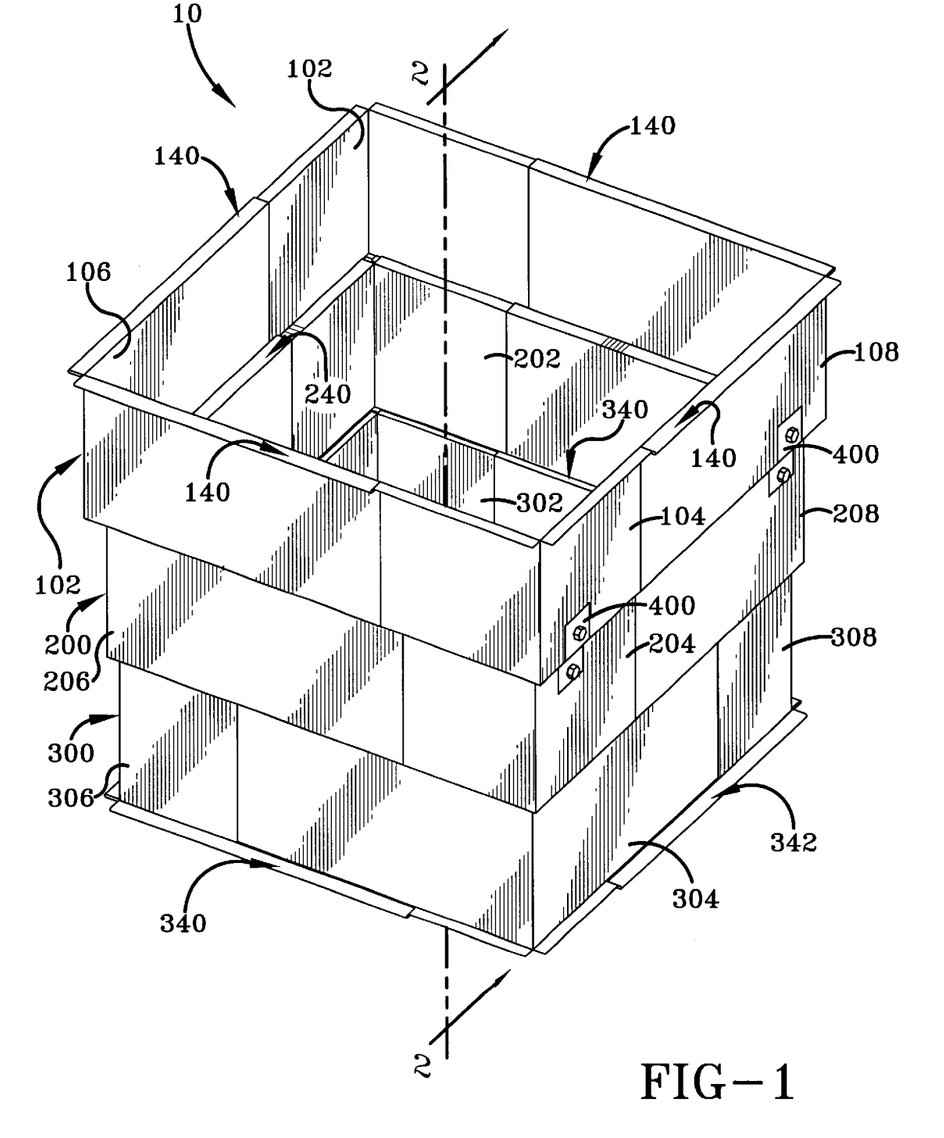
FIG. 1 is a perspective view of a transitional telescoping plenum apparatus according to this invention, shown expanded in the height dimension.

With reference to FIG. 1, it can be seen that a transitional telescoping plenum apparatus according to this invention is designated generally by the numeral 10. Plenum apparatus 10 includes, in this particularly preferred embodiment, a first tier 100, a second tier 200, and a third tier 300. Tiers 100, 200, 300 are interconnected with one another in such a manner as to allow for plenum apparatus 10 to be adjustable in its height dimension, which, in the orientation of FIG. 1, is the vertical dimension. More particularly, first tier 100 communicates with second tier 200 so as to be capable of telescoping vertically in relation thereto. Likewise, second tier 200 communicates with first tier 100 and third tier 300 so as to be capable of telescoping vertically with respect to those two tiers 100, 300. Similarly, third tier 300 communicates with second tier 200 so as to be capable of telescoping vertically in relation thereto. The specifics of this telescoping relationship between first, second and third tiers 100, 200 and 300 will be described more fully herein below, but, first, the configuration of an individual tier section is disclosed.

Referring now to FIGS. 2–5, first tier 100 is considered; however, it should be appreciated that the general structure of first tier 100 is repeated for subsequent modular tiers, such as second tier 200, making up transitional telescoping plenum apparatus 10, and therefore, like parts in tier 200 have received like numerals, but increased by 100. Before proceeding, it should also be appreciated that the present invention focuses particularly upon providing a plenum apparatus 10 having at least two tiers, such as first tier 100 and second tier 200, and may encompass a plenum apparatus 10 having any number of tiers interconnected according to this invention. The three tier plenum apparatus shown in the Figures is a preferred embodiment that should be useful for most installation applications. Additionally, the last or bottom-most tier, here tier 300, preferably has a slightly modified configuration, as shown in the drawings, and tier 300 will therefore be individually disclosed, although an attempt is made to employ like numerals to those employed in disclosing tier 100, this time increased by 200. The "bottom-most tier" is designated as such simply due to the orientation of the apparatus 10 in the Figs., and the designation as such is to be non-limiting. Finally, the bottom-most tier (e.g., tier 300) may have a configuration substantially identical to the other modular tiers (e.g., tiers 100, 200) although, for ease of installation, the configuration shown is particularly preferred. This will be more fully understood as the disclosure continues.

In FIGS. 2–5, first tier 100 is shown as including first corner section 102, second corner section 104, third corner section 106, and fourth corner section 108. As perhaps best appreciated in FIGS. 1 and 3, these corner sections 102, 104, 106 and 108 are interleaved to provide first tier 100 with a four-sided configuration. Generally, this foursided configuration will be rectangular with each corner section 102, 104, 106, 108 including a bend 109 forming a right angle A, although the invention is not to be limited to such an embodiment. It will be appreciated that the four-sided configuration of each tier, here first tier 100, can take on virtually any four-sided shape by adjusting angle A accordingly for each corner section 102, 104, 106 and 108. It should also be appreciated that, while the four-sided, generally rectangular configuration is particularly preferred and believed to be of the greatest utility, the concept of the present invention may be expanded to provide tiers of other polygonal shapes. For example, five "corner sections" could be employed to provide a pentagonal shape, and six corner sections could be employed to provide an hexagonal shape. The more corner sections employed, the larger the angle (such as angle A) of each bend in each corner section. Ultimately, with a great number of corner sections, the completed tier might take on a substantially circular appearance. Thus, the present invention is broadly disclosed as having tiers of "at least" first, second, third, and fourth corner sections. Still, the generally rectangular shape of the embodiment of the Figs. is believed to be the best and most useful mode for practicing this invention.

In order that first, second, third, and fourth corner sections 102, 104, 106 and 108 may be interleaved to provide a complete first tier 100, first and second corner sections 102, 104 include outwardly extending mail slides 110 at their respective top edges 112, and include inwardly extending female guides 114 at their respective bottom edges 116. In a complimentary fashion, third and forth corner sections 106, 108 include outwardly extending female guides 118 at their respective top edges 120, and include inwardly extending male slides 122 at their respective bottom edges 124. Corner sections 102, 104, 106, and 108 are preferably constructed from a unitary piece of sheet metal, more preferably, 26 gauge galvanized sheet metal, although the present invention is not limited thereto or thereby. Indeed, it will be appreciated that corner sections 102, 104, 106, 108 need not be of unitary construction inasmuch as they might be fabricated from separate pieces of material suitably joined together, for example, through spot wielding at their corners (bend 109). Regardless of whether such elements of this invention might be of single or multiple piece construction, the terminology used herein, designating such elements as "corner sections" should be understood to cover such alternate designs. When constructed in the preferred, unitary construction manner, corner sections 102, 104, 106 and 108 are generally made by bending the sheet metal to create angle A, with a portion of the sheet metal being split at respective corners 126, both at respective top edges 112, 120 and bottom edges 116, 124, in order to allow male slides 110, 122 and female guides 114, 118 to be bent and formed.

Figure 2:
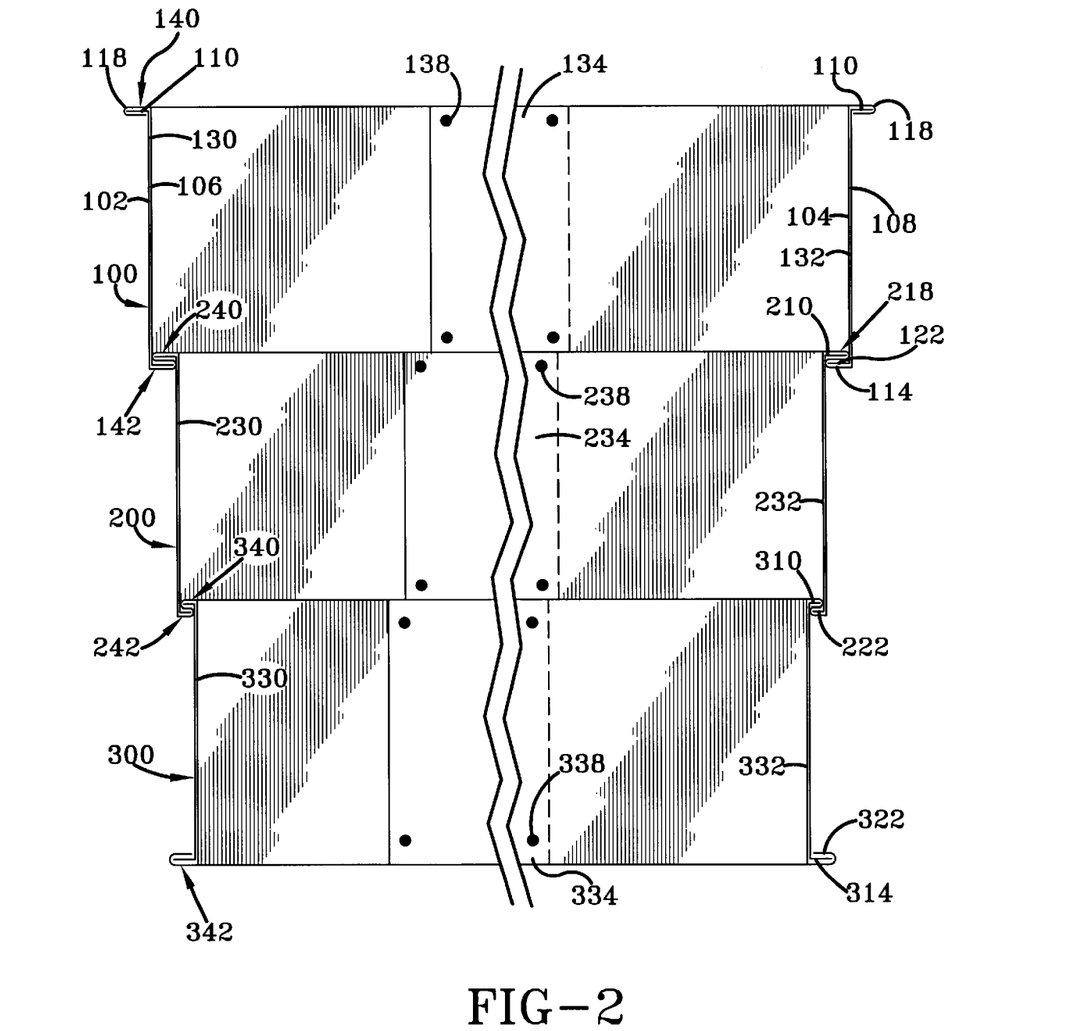
FIG. 2 is a cross sectional view taken along the perspective line 2—2 of FIG. 1.
Figure 3:
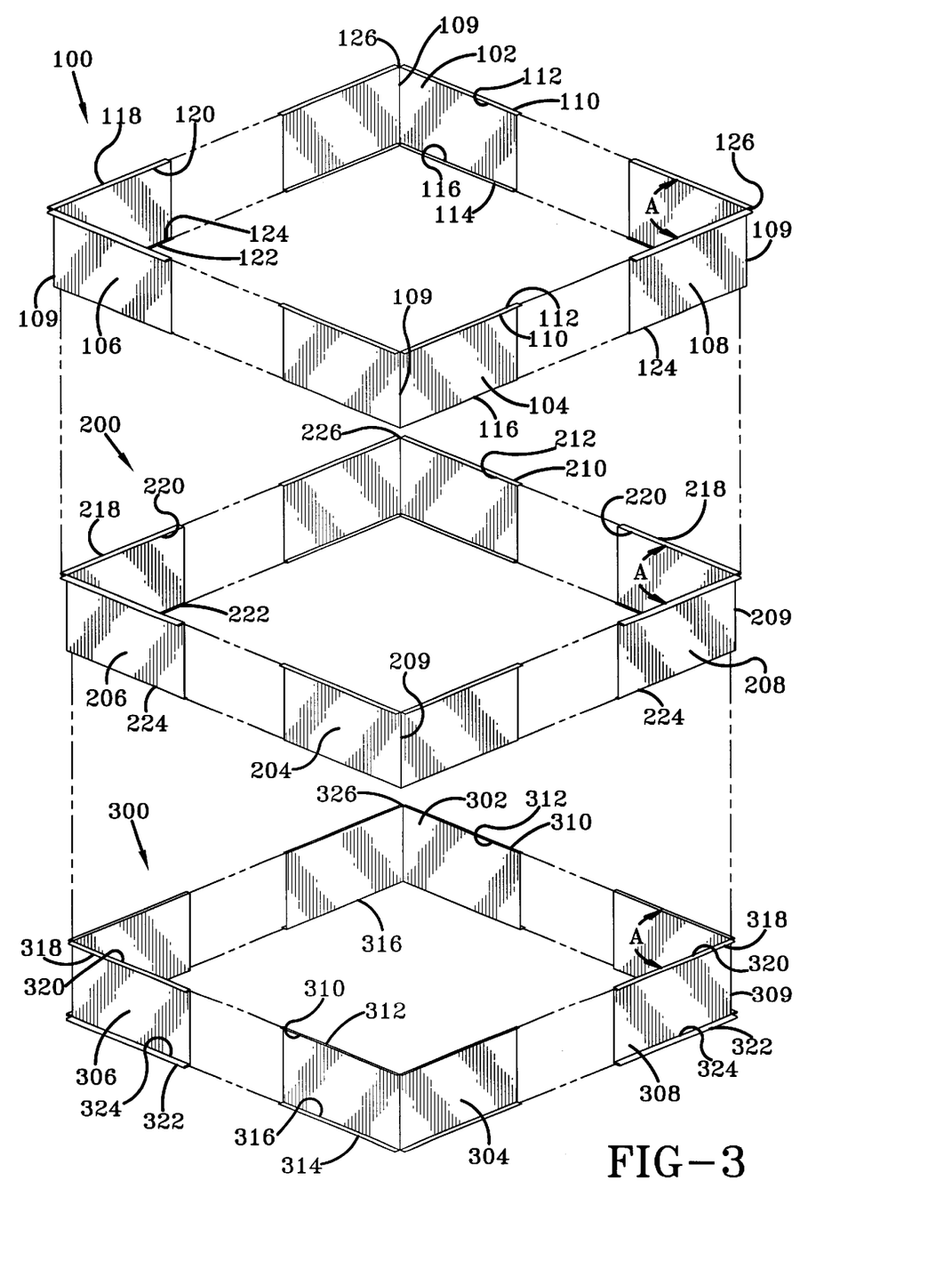
FIG. 3 is a perspective view of a disassembled transitional telescoping plenum apparatus, indicating the interrelation of the four corner sections that make up each tier as well as the interrelation between the various tiers.
Figure 4:
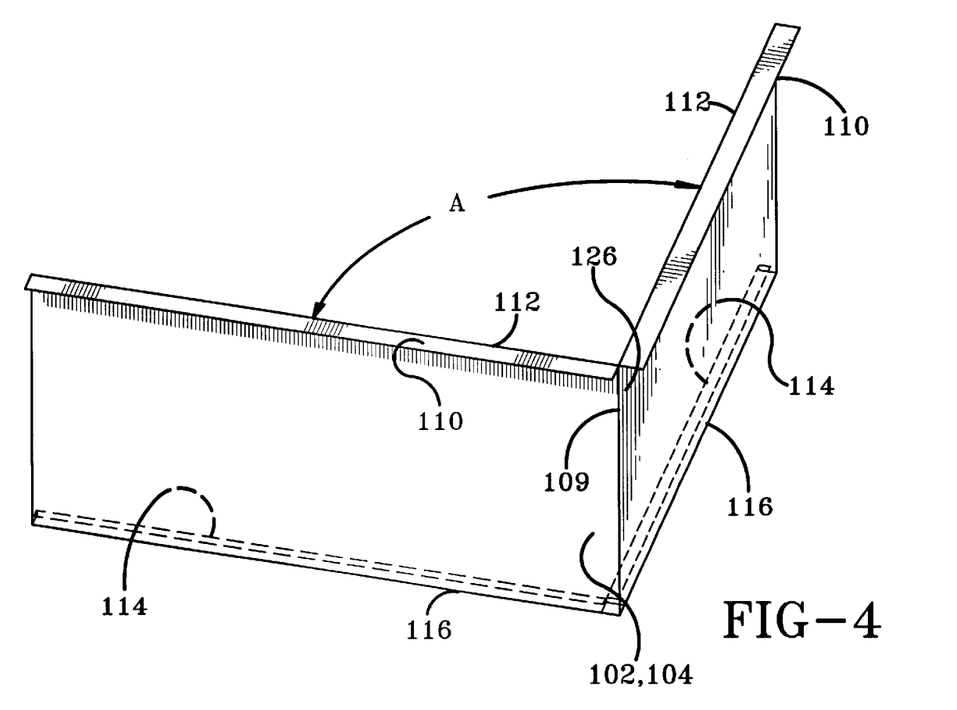
FIG. 4 is a perspective view of two corner sections of a top modular tier of a preferred plenum apparatus.
Figure 5:
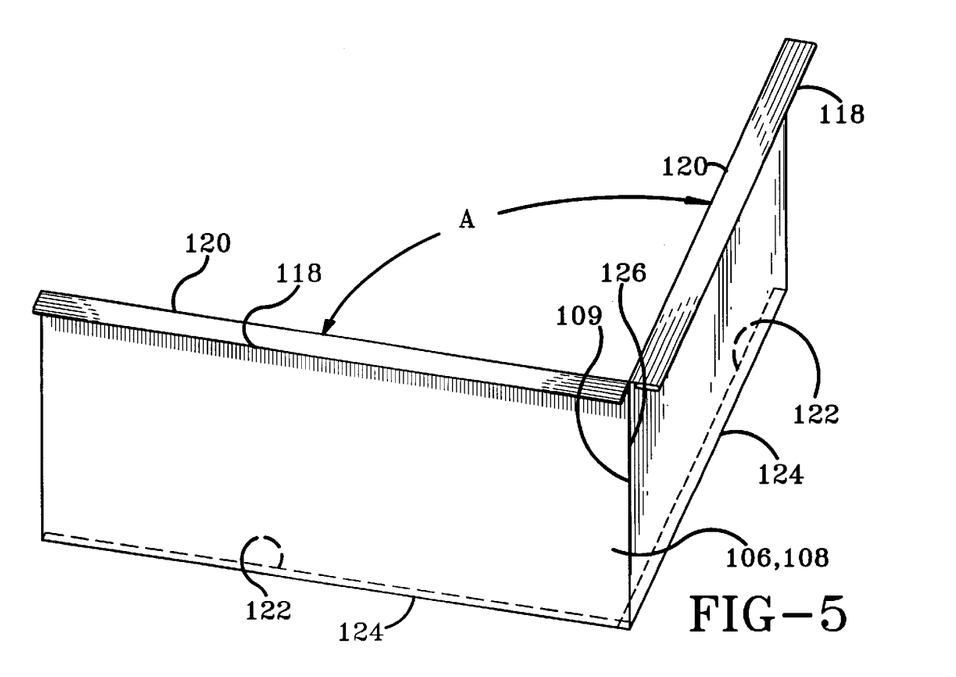
FIG. 5 is a perspective view of two corner sections that are complementary to the corner sections of FIG. 4, and interleave therewith to provide a completed top tier.
Figure 6:
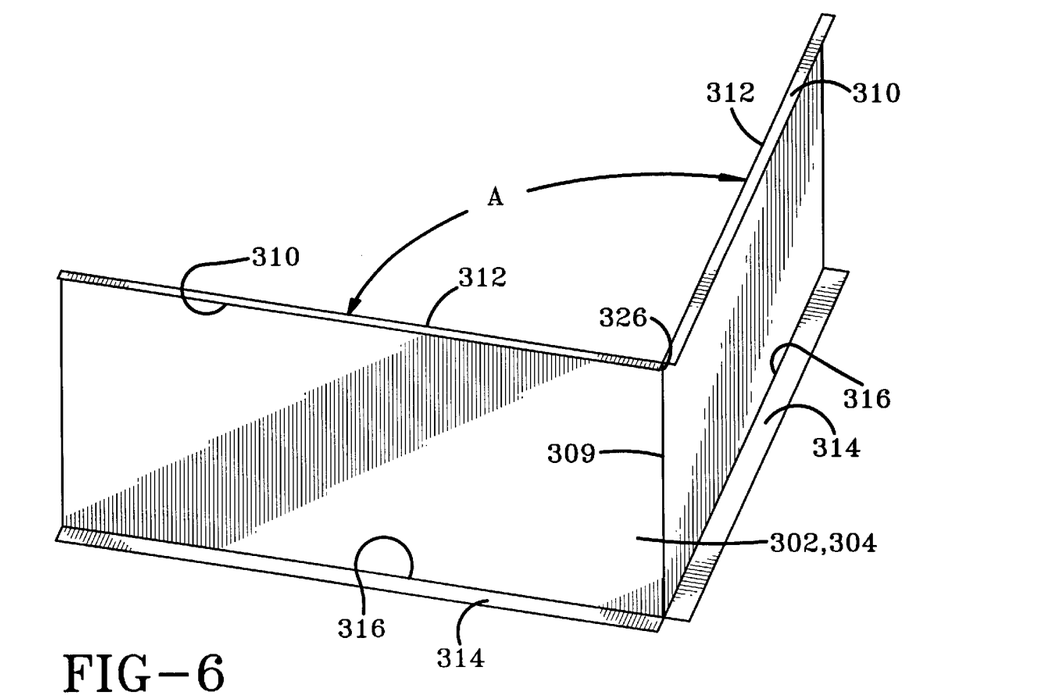
FIG. 6 is a perspective view of two corner sections of a bottom modular tier of a preferred plenum apparatus.
Figure 7:
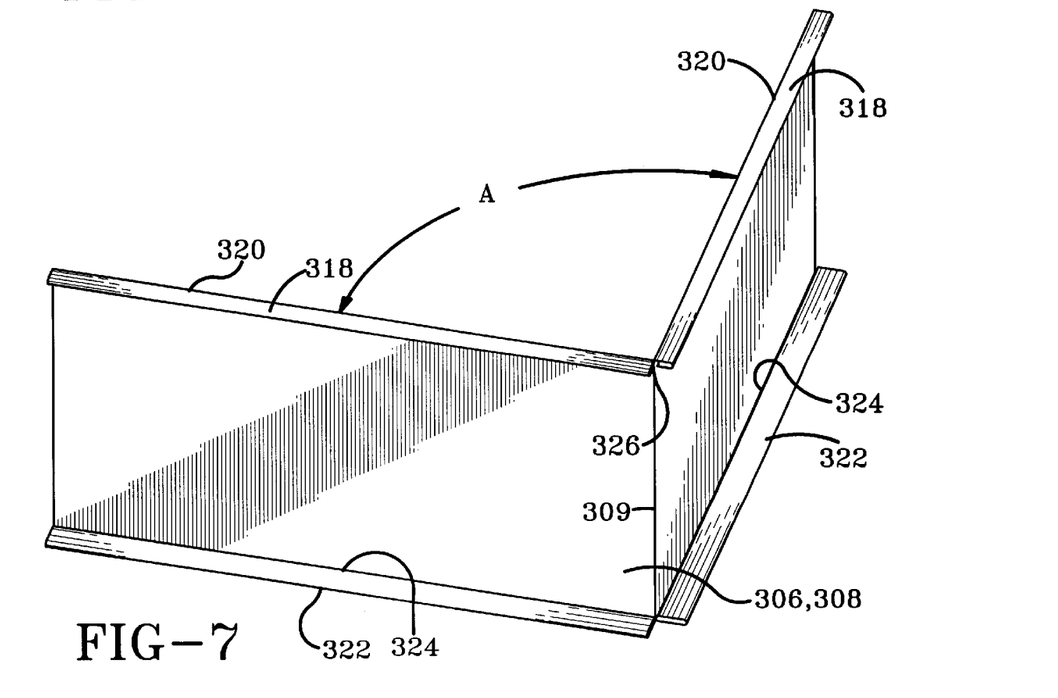
FIG. 7 is a perspective view of two corner sections that are complementary to the corner sections of FIG. 4, and interleave therewith to provide a completed bottom tier.

It will be appreciated from FIG. 3 that corner section 102 is interleaved with corner sections 106 and 108; that corner section 104 is interleaved with corner sections 106 and 108; that corner section 106 is interleaved with corner sections 102 and 104; and that corner section 108 is interleaved with corner sections 102 and 104. With reference to FIG. 2, it can be seen that male slides 110 of corner sections 102, 104 fit within female guides 118 of corner sections 106 ,108, and, likewise, male slides 122 of corner sections 106, 108 fit within female guides 114 of corner sections 102, 104. With this configuration, it will be appreciated that top tier 100 can be expanded or contracted independently, in length and width directions, because male slides 110 can telescope within female guides 118 and male slides 122 can telescope within female guides 114. With this telescoping configuration, overlap 130 is provided between corner section 102 and 106, overlap 132 is provided between corner sections 104 and 106, overlap 134 is provided between corner sections 102 and 108, and a similar overlap (not shown due to the cross-sectional view) is provided between corner sections 104, 108. Overlaps 132, 134 allow top tier 100 to be adjustable in the width direction, while overlap 130 and the overlap not shown allow the top tier 100 to be adjustable in the length direction. Appropriate fasteners 138 are employed to connect these overlapping areas once the desired size of plenum apparatus 10 is known and achieved through telescoping of the individual tiers of the device. Generally, fasteners 138 would be screws, but other fastening means such as rivets and spot welding may be used, and the present invention is not limited to any type of fastener 138.

As mentioned, the configuration of second tier 200 is substantially identical to the configuration of tier 100, and like parts have received like numerals in the Figs. although increased by 100. Additionally tier 200, as shown, is telescoped in length and width dimensions in order that tier 200 can telescope within tier 100 in the height dimension. Corner sections 202, 204, 206, and 208 are preferably constructed from a unitary piece of sheet metal, although the present invention is not limited thereto or thereby. When constructed in this preferred manner, corner sections 202, 204, 206 and 208 are generally made by bending the sheet metal to create angle A, with a portion of the sheet metal being split at respective corners 226, both at respective top edges 212, 220 and bottom edge 216, 224, in order to allow male slides 210, 222 and female guides 214, 218 to be bent and formed. As disclosed with respect to tier 100, tier 200 might include corner sections of multiple piece construction, and, when appropriate, might be formed of more than four "corner sections" (i.e., be pentagonal or hexagonal, etc.).

In the assembled diagram of FIG. 1, it will be appreciated that tier 100 provides mounting flange 140, which is defined, at various sections, by either male slides 110 or female guides 118 or both (i.e., at overlaps 130, 132). Mounting flange 140 allows top tier 100 to be connected to ductwork or another HVAC installation, with appropriate fasteners (not shown). Similarly, tier 100 provides tier-connecting flange 142, which is defined, at various sections, by either male slides 122 or female guides 114 or both. Tier-connecting flange 142 communicates with tier-connecting flange 240 of second tier 200, as perhaps best seen in FIG. 2. Although flange 140 of first tier 100 is designated as a "tier-mounting flange" and flange 240 of second tier 200 is designated as a "tier-connecting flange" it should be appreciated that the configuration is substantially identical. Tier-connecting flange 240 is so named because it functions to help "connect" tier 200 to tier 100, more particularly, it limits the ultimate movement of tier 200 so that it can rest within tier 100 as shown in the orientation in the Figs. In FIG. 2, it can be seen that second tier 200 can telescope vertically within first tier 100, although the extent to which it may telescope is limited by contact between tier-connecting flanges 142, 240. Also, it should be appreciated that, given the structure of second tier 200, second tier 200 can be fully removed from first tier 100 simply by pulling second tier 200 upwardly. This is a simple configuration for interconnecting first tier 100 and second tier 200 in that mounting flange 140 extends outwardly and tier-connecting flange 142 extends inwardly.

Figure 11:
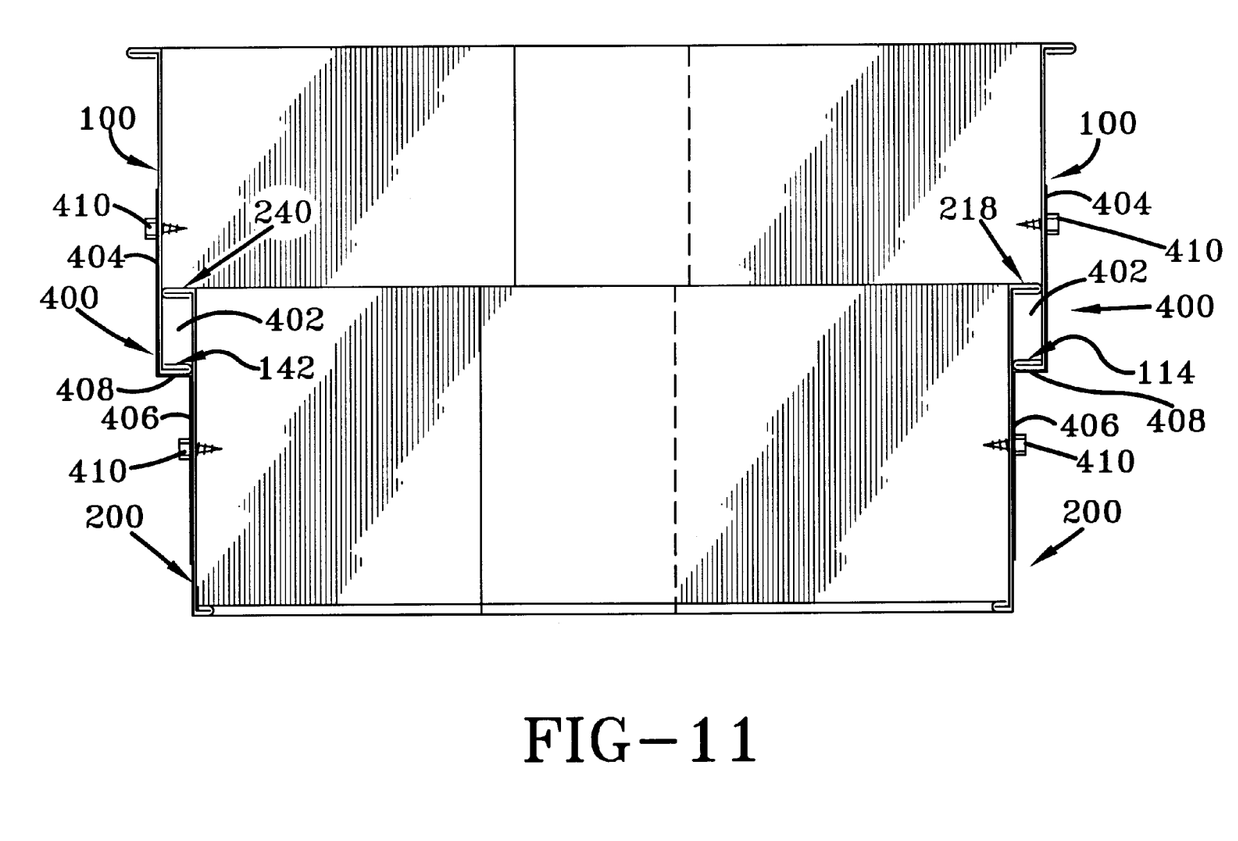
FIG. 11 is a cross-sectional view, similar to the view of FIG. 2, showing only two tiers, and, more particularly, depicting the use of clips to set the degree to which associated modular tiers are telescoped in relation to each other.

Referring now to FIG. 11, it should be appreciated that clips 400 might be employed to connect modular tiers, such as tiers 100 and 200, especially, when a space 402 is required between tier-connecting flanges 142,240, in order to make the composite plenum apparatus fit within a given application. Clip 400 simply includes two vertical sections 404, 406 ("vertical" according to the orientation in FIG. 11) that are offset by a horizontal section 408, which is sized according to the size of the tier-connecting flange (in this case flange 142) over which it must extend to bring vertical sections 404, 406 into contact with respective tiers 100, 200. Screws 410 (or other suitable fasteners) are inserted through vertical section 404, 406 to fix clip 400 and the relative degree of telescoping between associated tiers (here tiers 100, 200). Notably, clips 400 can also be seen in FIG. 1. Clips 400 are preferred, and will generally be employed on two opposing sides of the completed plenum apparatus 10, near the corners of two associated modular tiers.

Continuing regarding the flanges, it should be appreciated that tier-connecting flange 142 can extend outwardly in the direction opposite that shown in the drawings, although second tier 200 would be required to take a complementary structure (i.e. have an inwardly extending tier-connecting flange 240) to interconnect with tier 100. Additionally, this alternative configuration would be more difficult to assemble into a completed transitional telescoping plenum apparatus 10. Likewise, mounting flange 140 may extend inwardly, although this is believed to be a more difficult configuration with which to work. In preferred modes, if middle tiers (such as second tier 200) are employed, they are configured to interconnect and telescope with associated tiers (such as tier 100 and tier 300) as shown in the drawings and described above. Additionally, in preferred modes, the top-most tier (here tier 100) and the bottom-most tier (here tier 300) both preferably provide outwardly extending mounting flanges. (i.e., mounting flanges 140, 342), because it is believed that outwardly extending mounting flanges are simply easier to access during an installation.

Notably, and as mentioned above, in preferred embodiments, the bottom-most tier (here tier 300) is configured differently than other modular tiers (here tiers 100, 200). More particularly, tier 300 (or the bottom-most tier) preferably provides two outwardly extending flanges. Thus, with reference to FIGS. 2, 3, 6 and 7, it can be seen that third tier 300 includes first corner section 302, second corner section 304, third corner section 306 and forth corner section 308. These corner sections 302, 304, 306 and 308 are interleaved to provide third tier 300 with a four-sided configuration. To provide a complete third tier 300, first and second corner sections 302, 304 include outwardly extending male slides 310 at their respective top edges 312, and include outwardly extending male slides 314 at their respective bottom edges 316. In a complementary fashion, third and fourth corner sections 306, 308 include outwardly extending female guides 318 at their respective top edges 320, and include outwardly extending female guides 322 at their respective bottom edges 324. With reference to FIG. 3, it can be seen that male slides 310 and 314 of corner sections 302, 304 respectively fit within female guides 318 and 322 of corner sections 306, 308 to create a completed tier 300 that may telescope in length and width directions. As with other modular tiers (i.e., tier 100 and 200), overlap areas 330, 332, 334 are fixed with appropriate fasteners 338, once the desired size of plenum apparatus 10 is known and achieved through telescoping of the individual tiers of the device.

This bottom-most third tier 300 provides two outwardly extending flanges 340 and 342. Flange 340 is substantially similar to flanges 140 and 240, and functions substantially identically to tier-connecting flange 240. Thus, flange 340 is considered a tier-connecting flange. Flange 342, however, is somewhat different from tier-connecting flanges 142, 242 in that it extends outwardly. As mentioned above, this is merely preferred inasmuch as flange 342, in the preferred embodiment, is provided to mount tier 300, and is thus considered a tier-mounting flange, as is flange 140 of tier 100.

As shown, tier 300 is telescoped in length and width dimensions in order that tier 300 can telescope within tier 200 in the height dimension. More particularly, tier connecting flange 340 functions to connect tier 300 to tier 200 by limiting the movement of tier 300 so that it can rest within tier 200 as shown in the orientation in the figures. In FIG. 2, it can be seen that third tier 300 can telescope vertically within second tier 200, although the extent to which it may telescope is limited by contact between tier-connecting flanges 242, 340. Also, it should be appreciated that, given the structure of third tier 300, third tier 300 can be fully removed from second tier 200 (and first tier 100) simply by pulling third tier 300 upwardly. This is a simple configuration for interconnecting third tier 300 and second tier 200 in that mounting flange 240 extends outwardly and tier connecting flange 242 extends inwardly. However, as mentioned with respect to other modular tiers, various flanges can extend in different directions from that shown in the preferred embodiment, with the understanding that the structure of communicating tiers would be required to take a complimentary structure. Additionally, it will be appreciated that clips 400 might be employed to fix the degree of telescoping between tier 300 and tier 200.

Although the present invention is not to be limited to any particular recitation of dimensions, particularly preferred dimensions for the tiers 100, 200, 300 of the preferred embodiment are disclosed as being believed to be the most useful sizes to employ in the relevant market. Corner sections 102, 104, 106, 108 of tier 100 are preferably 12 inches in their length and width directions, and are preferably 6 inches in height from their respective top edges 112, 120 to their respective bottom edges 122, 124. Male slides 110 extend outwardly from top edge 112 to a length of proximately ½ inch, while female guide 118, which receives male slide 110, extends outwardly from top edge 120 to approximately ⅝ inch and curves back upon itself (as shown) for approximately ½ inch to create the completed guide 118. Male slide 122 extends inwardly from bottom edge 124 to a distance of approximately ¼ inch, while female guide 112 extends inwardly from bottom edge 122 to a distance of approximately ⅜ inch, and bends back upon itself to a distance of approximately ¼ inch to create the completed female guide 112. As with tier 100, corner sections 202, 204, 206, 208 are 12 inches in length and width and approximately 6 inches in height. Male slide 210 extends outwardly from top edge 212 to a distance of approximately ¼ inch, while female guide 218 extends outwardly from top edge 120 to a distance of approximately ⅜ inch, and bends back upon itself to a distance of about ¼ inch. Male slide 214 extends inwardly from bottom edge 216 to a distance of approximately ¼ inch, while female guide 214 extends inwardly from bottom edge 216 to a distance of approximately ⅜ inch, and bends back upon itself to a distance of approximately ¼ inch. Corner sections 302, 304, 306, 308 of tier 300 are also preferably 12 inches in length and width, and 6 inches in height. Male slide 310 preferably extends outwardly from top edge 312 to a distance of approximately ¼ inch, while female guide 318 extends outwardly from top edge 320 to a distance of approximately ⅜ inch, and bends back upon itself to a distance of approximately ¼ inch. Male slide 314 extends outwardly from bottom edge 316 to a distance of approximately ½ inch, while female guide 322 extends outwardly from bottom edge 324 to a distance of approximately ⅝ inch, and bends back upon itself to a distance of approximately ½ inch. It will be appreciated that, in the preferred embodiment, slide 314 and guide 322 are sized sufficiently large to provide an adequately sized tier-mounting flange 342.

The transitional telescoping plenum apparatus of this invention is intended to allow the interconnection of HVAC equipment to duct systems. The unit expands in three directions—length, width and height—and can fit virtually all applications. These applications are particularly suited for residential and light commercial HVAC package equipment and split forced-air systems, although the present invention is not limited to or by such applications. The dimensions noted in the above disclosure are believed to be the most common sizes required to fit such typical HVAC equipment. It should be noted, however, that different dimensions can be used to accommodate different groups of equipment. Without limitation, the transitional telescoping plenum apparatus of this invention is designed to adapt gas and electric furnaces, air-handling units, evaporated coils, packaged forced air units, in-line air cleaners, air filter racks and the like to duct systems. It is intended to be used in both supply air and return air connections, from the equipment to the duct system.

Figures 8, 9, 10:
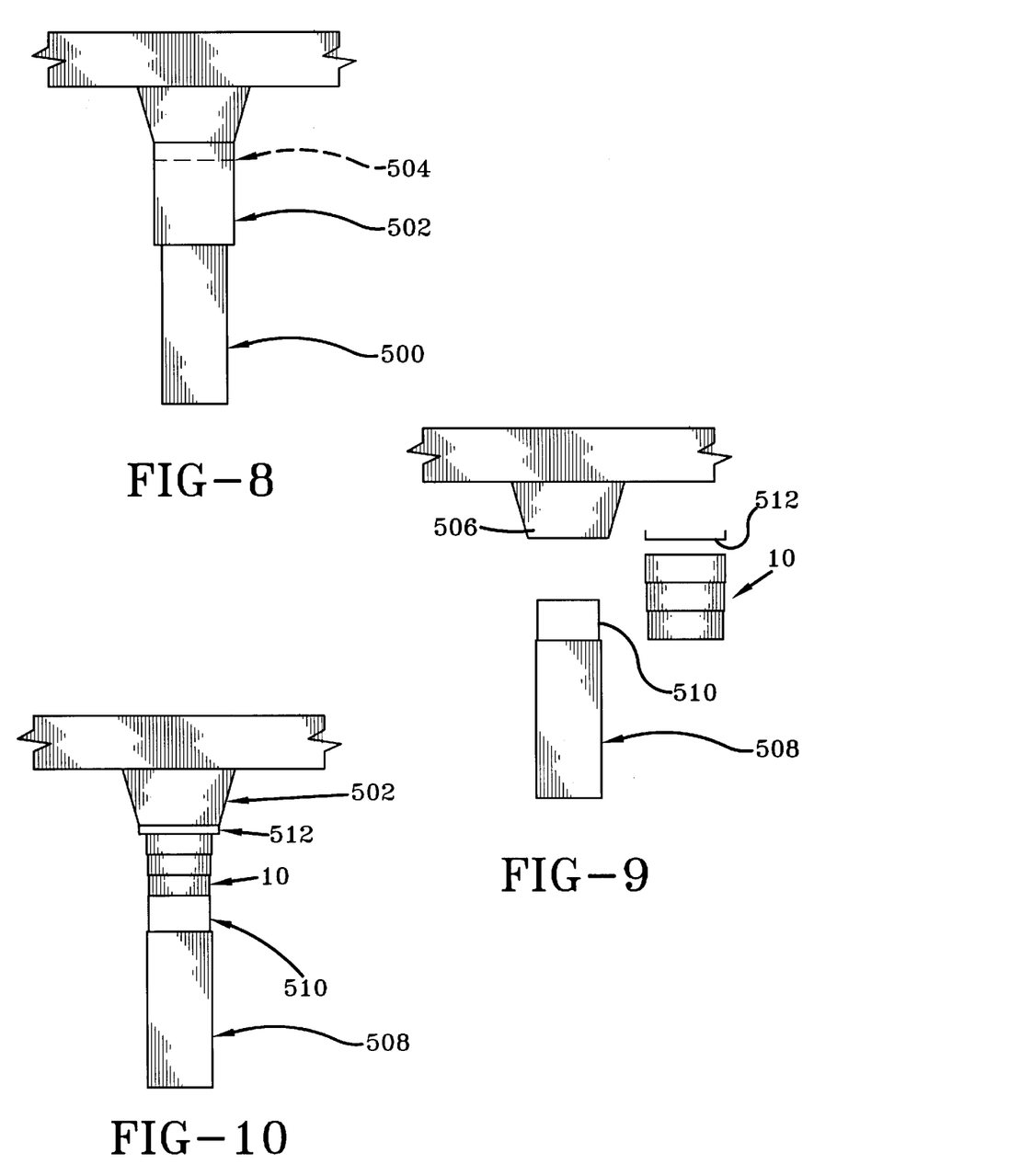
FIG. 8 is a front elevational view of a furnace and ductwork, showing the first step of removing the furnace.
FIG. 9 is a front plan view, as in FIG. 8, with the furnace removed from FIG. 8 being replaced with a new furnace and evaporator coil, and showing the installation of the transitional telescoping plenum apparatus of this invention.
FIG. 10 is a front elevational view of the completed installation of the new furnace, evaporator coil, and transitional telescoping plenum apparatus of FIG. 9.

Perhaps the largest market that exists for the transitional telescoping plenum apparatus of this invention is in the retrofit of HVAC equipment. Referring to FIGS. 8–10, such a typical application is depicted. FIG. 8 shown an old furnace 500 being removed from a facility by cutting part of the duct system 502 at a cut line 504, leaving a remainder of the duct system designated in FIG. 9 as 506. With reference to FIGS. 9 and 10, it is seen that a new furnace 508 is put in place, and a cased evaporator coil 510 is also positioned between the remaining ductwork 506 and new furnace 508. A cap 512 is inserted into the remaining ductwork 506, where it was cut. Finally, a transitional telescoping plenum apparatus 10 is expanded in length and width and height dimensions in order to attach it between the new furnace 508 and the old duct system 506. Clips, such as clips 400, might be employed to set the degree of telescoping, and, as is generally known in the art, joint/seam duct sealant, such as silicone or Uni-Mastic™ (United McGill), is preferably applied to all joints and seams within and between each modular tier and joining duct work. This is just one particular application for the transitional telescoping plenum apparatus according to this invention, and it will be appreciated that there are many other uses and applications, both within and outside of the HVAC field.

In light of the foregoing, it should thus be evident that the process of the present invention, providing a transitional telescoping plenum apparatus, substantially improves the art. While, in accordance with the patent statutes, only the preferred embodiments of the present invention have been described in detail hereinabove, the present invention is not to be limited thereto or thereby. Rather, the scope of the invention shall include all modifications and variations that fall within the scope of the attached claims.

What is claimed is:

1. A transitional telescoping plenum apparatus comprising:
   a first tier including at least first, second, third, and fourth corner sections interleaved to provide said first tier with an at least four-sided configuration that is adjustable in width and length dimensions, said first tier providing a mounting flange at a first edge thereof and a tier-connecting flange at a second edge thereof; and
   a second tier including at least first, second, third, and fourth corner sections interleaved to provide said second tier with an at least four-sided configuration complimentary to said at least four-sided configuration of said first tier and adjustable in width and length dimensions, said second tier providing a tier-connecting flange at a first edge thereof communicating with said tier-connecting flange of said first tier to connect said first and second tiers, wherein the height of the transitional telescoping plenum apparatus is adjustable according to the distance maintained between said tier-connecting flanges of said first tier and said second tier.

2. The transitional telescoping plenum apparatus of claim 1, wherein said second tier further provides a mounting flange at a second edge thereof.

3. The transitional telescoping plenum apparatus of claim 1, wherein said first and second corner sections of said first tier each include outwardly extending male slides at a top edge thereof and inwardly extending female guides at a bottom edge thereof, and said third and fourth corner sections of said first tier each include outwardly extending female guides at a top edge thereof and inwardly extending male slides at a bottom edge thereof, said male slides of said first and second corner sections mating with said female guides of said third and fourth corner sections to provide said mounting flange of said first tier, said male slides of said third and fourth corner sections mating with said female guides of said first and second corner sections to provide said tier-connecting flange of said first tier.

4. The transitional telescoping plenum apparatus of claim 3, wherein said first and second corner sections of said second tier each include outwardly extending male slides at a top edge thereof, and said third and fourth corner sections of said second tier each include outwardly extending female guides at a top edge thereof, said male slides of said first and second corner sections mating with said female guides of said third and fourth corner sections to provide said tier-connecting flange of said second tier.

5. The transitional telescoping plenum apparatus of claim 1, wherein said second tier further provides a second tier-connecting flange at a second edge thereof, and the transitional telescoping plenum apparatus further comprises:

a third tier including first, second, third, and fourth corner sections interleaved to provide said third tier with a four-sided configuration complimentary to said four-sided configuration of said second tier and adjustable in width and length dimensions, said third tier providing a tier-connecting flange at a first edge thereof communicating with said second tier-connecting flange of said second tier to connect said second and third tiers, wherein the height of the transitional telescoping plenum apparatus is adjustable according to the distance maintained between said tier-connecting flanges of said first tier and said second tier and/or the distance maintained between said tier-connecting flanges of said second tier and said third tier.

6. The transitional telescoping plenum apparatus of claim 1, further comprising at least one clip suitably fastened between said first and said second tier to maintain a desired distance between said tier-connecting flanges of said first tier and said second tier.

* * * * *